United States Patent
Ryu

(10) Patent No.: US 6,729,555 B2
(45) Date of Patent: May 4, 2004

(54) ULTRASONICALLY OPERATED LIQUID FUEL MODIFYING SYSTEM

(76) Inventor: Jeong In Ryu, 219-26, Yongmun-dong, Seo-gu, Daejeon (KR), 302-220

(*) Notice: Subject to any disclaimer, the term of this patent is extended or adjusted under 35 U.S.C. 154(b) by 247 days.

(21) Appl. No.: 09/959,301

(22) PCT Filed: Feb. 23, 2001

(86) PCT No.: PCT/KR01/00279
§ 371 (c)(1),
(2), (4) Date: Oct. 23, 2001

(87) PCT Pub. No.: WO01/62878
PCT Pub. Date: Aug. 30, 2001

(65) Prior Publication Data
US 2002/0158141 A1 Oct. 31, 2002

(51) Int. Cl.[7] .............................. B05B 1/08; B05B 3/04; B05B 1/24
(52) U.S. Cl. .............................. 239/102.1; 239/102.2; 239/134
(58) Field of Search .......................... 239/102.1, 102.2, 239/4, 128, 134, 135, 124, 303, 398, 399, 463, 468, 417.5, 419; 44/302, 303, 325, 326, 629, 639

(56) References Cited

U.S. PATENT DOCUMENTS

| | | | |
|---|---|---|---|
| 3,809,372 A | * | 5/1974 | Duthion et al. ............. 366/119 |
| 3,941,552 A | * | 3/1976 | Cottell ............................ 431/2 |
| 4,344,404 A | * | 8/1982 | Child et al. ................... 123/538 |
| 4,400,177 A | * | 8/1983 | Cottell ............................ 44/282 |
| 4,401,437 A | * | 8/1983 | Poetschke et al. ............. 44/629 |
| 4,403,997 A | * | 9/1983 | Poetschke ...................... 44/629 |
| 4,613,084 A | * | 9/1986 | Takamoto et al. ............. 241/16 |
| 6,053,424 A | | 4/2000 | Gipson et al. |

FOREIGN PATENT DOCUMENTS

JP          53-140642          12/1978

* cited by examiner

*Primary Examiner*—Davis Hwu
(74) *Attorney, Agent, or Firm*—Lowe Hauptman Gilman & Berner LLP

(57) ABSTRACT

According to the present invention, there is provided an ultrasonically operated liquid fuel modifying device for applying an ultrasonic wave to liquid fuel having high viscosity and poor quality, and modifying it into good emulsified oil. The modifying system of the present invention comprises: a fuel tank (10) for storing liquid fuel having high viscosity and poor quality; a water tank (20) for storing water; an agitating device (30) for agitating the liquid fuel and water fed from the fuel and water tanks (10, 20), respectively; and an ultrasonically operated modifying device (40) including an ultrasonic vibration generator (56) for generating an ultrasonic wave so as to apply the ultrasonic wave to the liquid fuel and the water fed from the agitating device (30) and to modify it into good emulsified oil, and ultrasonic wave-generating portions (65).

4 Claims, 6 Drawing Sheets

ULTRASONICALLY OPERATED LIQUID FUEL MODIFYING SYSTEM

TECHNICAL FIELD

The present invention relates to an ultrasonically operated liquid fuel modifying system for applying an ultrasonic wave to liquid fuel having high viscosity and poor quality, and modifying it into good emulsified oil.

BACKGROUND ART

Liquid fuel having high viscosity and poor quality generates a large amount of harmful gas during its combustion process. This is because difficulty in making the liquid fuel into fine particles raises its burning point. Fuel having high burning point results in low combustion efficiency and causes incomplete combustion. Especially, poor liquid fuel contains many incombustible impurities, and thus, its combustion efficiency is further lowered.

Meanwhile, if the combustion efficiency is lowered, the liquid fuel should be consumed in an amount relatively larger than that of liquid fuel having low viscosity and good quality. In addition, harmful gas generated upon combustion of liquid fuel having high viscosity and poor quality is introduced into the human body through a respiratory organ, acting as a carcinogenic substance or causing chronic pulmonary disease after accumulated in the lungs. Especially, CO and HC contained in the combustion gas have a fatal impact on the human body. For example, they may hinder oxygen supply to the human body, and irritate a mucous membrane or eyes.

Therefore, in order to enhance the combustion efficiency and reduce the amount of generated harmful gas and fuel consumption, there is an urgent need for development of liquid fuel modifying device for modifying liquid fuel having high viscosity and poor quality into good emulsified oil.

According to this need, the present inventor has developed an ultrasonically operated liquid fuel modifying system for applying an ultrasonic wave to liquid fuel having high viscosity and poor quality and modifying it into good emulsified oil by using an ultrasonic sprayer for liquid fuel, which was filed by the present inventor and matured into Korean Patent No. 110,354.

DISCLOSURE OF INVENTION

An object of the present invention is to provide an ultrasonically operated liquid fuel modifying system for modifying liquid fuel having high viscosity and poor quality into good emulsified oil by using an ultrasonic wave so that the amount of generated harmful gas and fuel consumption can be reduced.

In order to achieve this object, according to the present invention, there is provided an ultrasonically operated liquid fuel modifying device comprising: a fuel tank for storing liquid fuel having high viscosity and poor quality; a water tank for storing water; an agitating device for agitating the liquid fuel and water fed from the fuel and water tanks, respectively; and an ultrasonically operated modifying device including an ultrasonic vibration generator for generating an ultrasonic wave so as to apply the ultrasonic wave to the liquid fuel and water fed from the agitating device and to modify it into good emulsified oil, and ultrasonic wave-generating portions.

Preferably, the ultrasonically operated modifying device further includes a plurality of cylinders which are sequentially communicated by passages so as to pass the liquid fuel and the water introduced through an inlet in due order and in which the ultrasonic wave-generating portions are disposed.

BEST MODE FOR CARRYING OUT THE INVENTION

Hereinafter, a preferred embodiment of an ultrasonically operated liquid fuel modifying system according to the present invention will be explained in detail with reference to the accompanying drawings.

Figure 1:
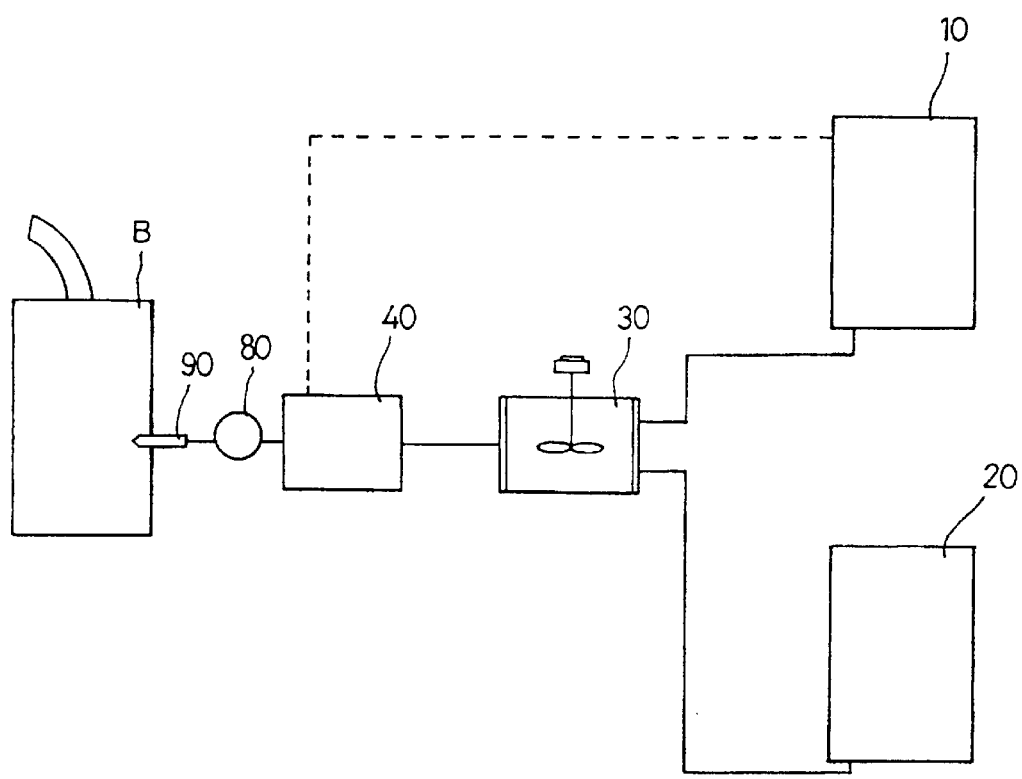
FIG. 1 is a schematic view showing the constitution of an ultrasonically operated liquid fuel modifying system according to the present invention.

First, referring to FIG. 1, the ultrasonically operated liquid fuel modifying system according to the present invention is schematically illustrated. As shown in this figure, the ultrasonically operated modifying system comprises a fuel tank 10 for storing liquid fuel and a water tank 20 for storing water. The ultrasonically operated modifying system further comprises an agitating device 30 and an ultrasonically operated modifying device 40. The agitating device 30 mixes the liquid fuel and water fed from the fuel and water tanks 10, 20, and the ultrasonically operated modifying device 40 applies an ultrasonic wave to the liquid fuel and water mixed by the agitating device 30 to a certain extent and emulsifies the mixture. In addition, the ultrasonically operated modifying system comprises a pump 80 for putting predetermined pressure on the liquid fuel discharged from the ultrasonically operated modifying device 40, and a nozzle 90 for spraying the liquid fuel discharged from the pump 80 into a combustion chamber in a burner B.

Figure 2:
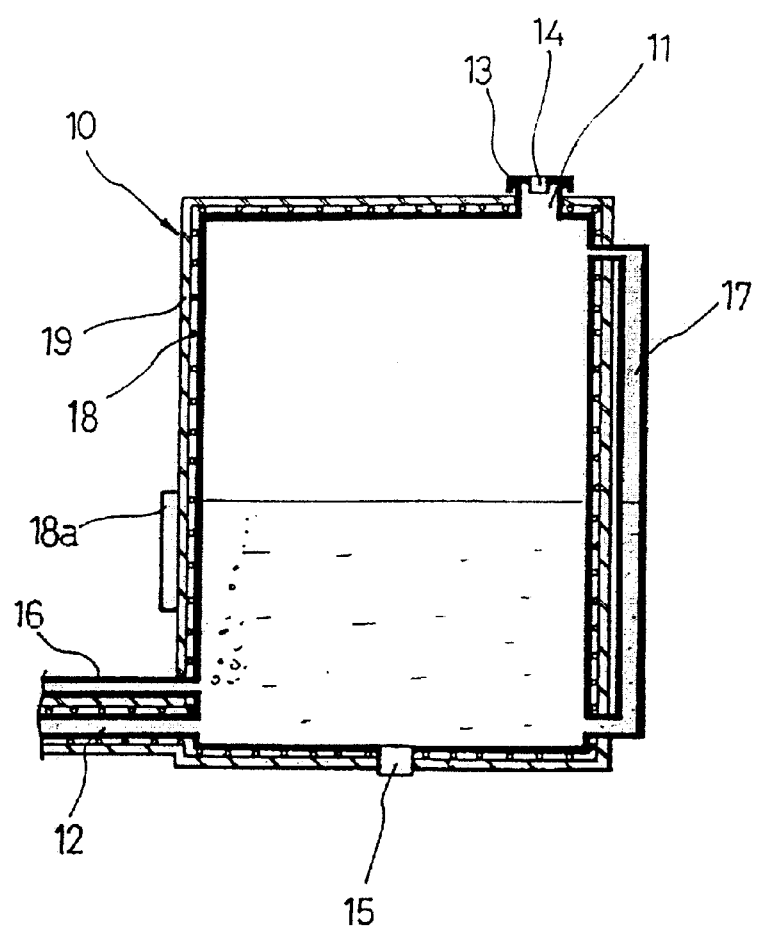
FIG. 2 is a sectional view showing the constitution of a fuel tank as a component of the present invention.

The above components will be explained in detail in the following. As shown in FIG. 2, the fuel tank 10 has a fuel injecting port 11 for injecting the fuel and a fuel discharging port 12 for discharging the fuel. A cap 13 for opening and closing the fuel injecting port 11 is disposed on the fuel injecting port 11. A pressure-regulating valve 14 for eliminating negative pressure in the fuel tank 10 is installed in the cap 13. A drain valve 15 for draining fuel dregs gathered on a bottom surface of the fuel tank 10 is installed at the bottom of the fuel tank 10. Side walls of the fuel tank 10 are provided with a return pipe 16 for returning evaporated fuel gas generated from the agitating device 30 and the ultrasonically operated modifying device 40 to the fuel tank 10, and with a flowmeter 17 for indicating a residual quantity of the fuel, respectively.

Meanwhile, a heating means for heating the liquid fuel, for example, heating wires 18, are disposed around an outer surface of the fuel tank 10. Thermal insulating material 19 for insulating between the fuel tank 10 and the outside is disposed around the heating wires 18. The heating wires 18 are operated by a temperature controller 18a installed on one side of the fuel tank 10. The temperature controller 18a performs control so that the liquid fuel stored in the fuel tank 10 is always kept at 100° C. The reason why the liquid fuel is heated is to activate the liquid fuel.

Figure 3:
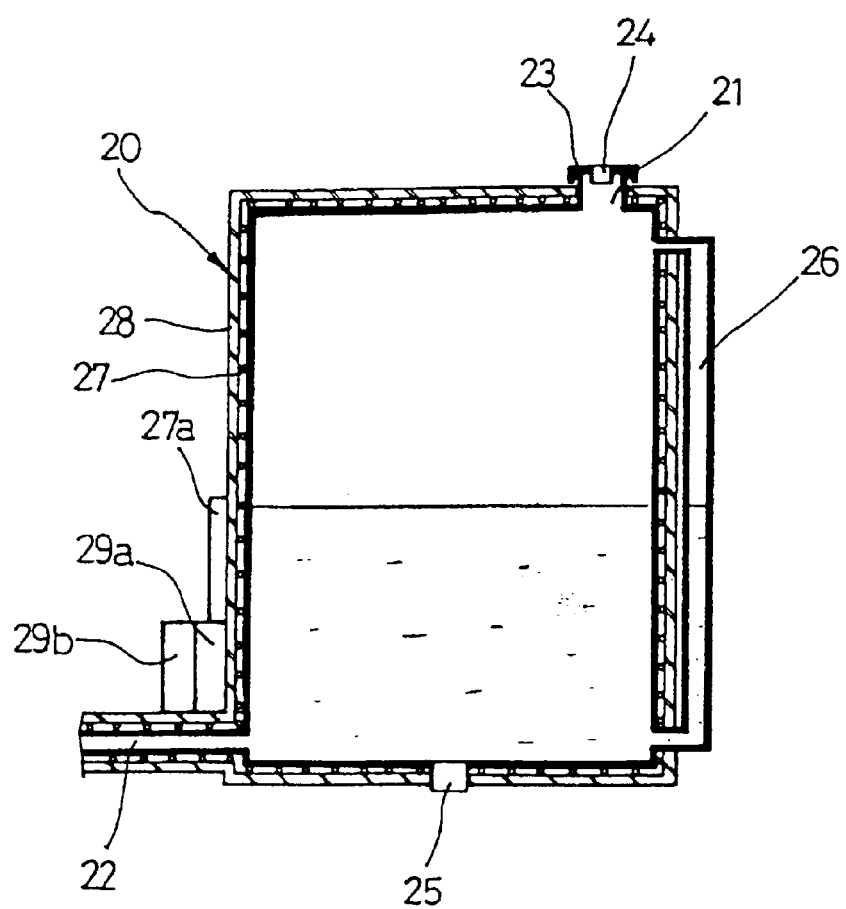
FIG. 3 is a sectional view showing the constitution of a water tank as a component of the present invention.

Further, in order to modify liquid fuel having high viscosity and poor quality into good emulsified oil, the water tank 20 feeds water. As shown in FIG. 3, the water tank 20 has a water injecting port 21 for injecting the water and a water discharging port 22 for discharging the water. A cap 23 for opening and closing the water injecting port 21 is disposed on the water injecting port 21. A pressure-regulating valve 24 for eliminating negative pressure in the water tank 20 is installed in the cap 23. A drain valve 25 for draining foreign substance gathered on a bottom surface of the water tank 20 is installed at the bottom of the water tank 20. A side wall of the water tank 20 is provided with a flowmeter 26 for indicating a residual quantity of the water.

Meanwhile, heating wires 27 for heating the water are disposed around an outer surface of the water tank 20. Thermal insulating material 28 for insulating between the water tank 20 and the outside is disposed around the heating wires 27. The heating wires 27 are operated by a temperature controller 27a installed on one side of the water tank 20. The temperature controller 27a performs control so that the water stored in the water tank 20 is always kept at 100° C. The reason why the water is heated is to make the water into the saturated water and facilitate mixing it with the liquid fuel having high viscosity and poor quality. In addition, in order to mix the liquid fuel with the heated water and maintain at a rate of the heated water of 10 to 20 volume %, a flow rate regulator 29a and a pressure regulator 29b for regulating the flow rate and pressure of the water are installed on the water tank 20, respectively.

Figure 4:
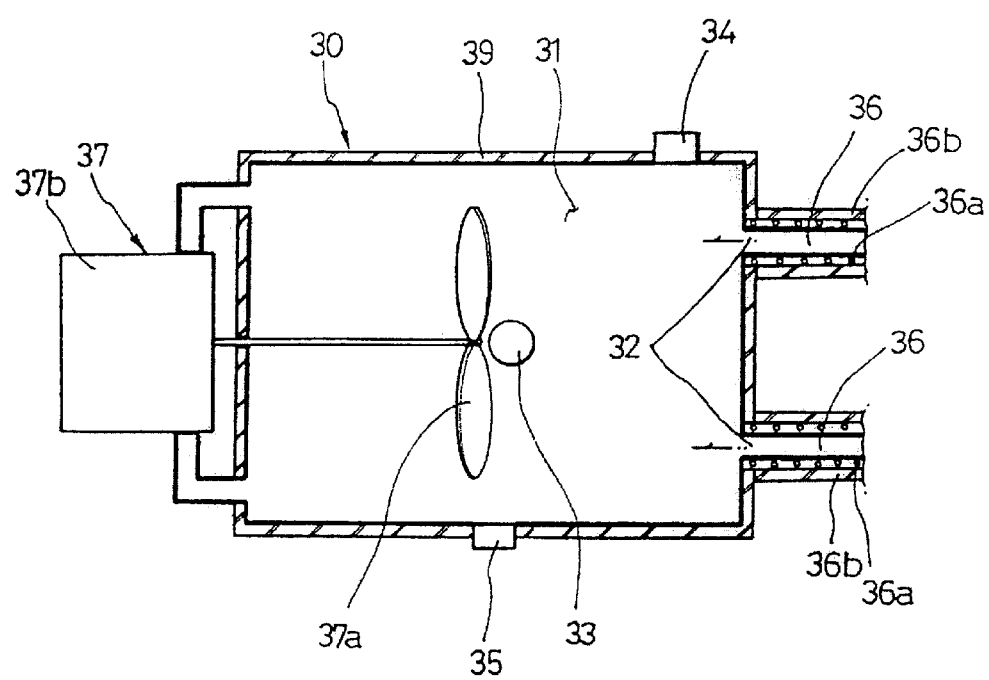
FIG. 4 is a sectional view showing the constitution of an agitating device as a component of the present invention.

Meanwhile, the agitating device 30 mixes the liquid fuel and the water. As shown in FIG. 4, it has an agitating chamber 31. The agitating chamber 31 has two introducing ports 32 and one discharging port 33. The two introducing ports 32 are connected to the fuel discharging port 12 of the fuel tank 10 and the water discharging port 22 of the water tank 20, respectively, and thus, the liquid fuel and water are fed therefrom. The discharging port 33 discharges the mixed liquid fuel and water. In addition, the agitating device 30 is provided with a pressure-regulating valve 34 for eliminating negative pressure in the agitating chamber 31 and with a drain valve 35 for draining foreign substance gathered on a bottom surface of the agitating chamber 31. On the other hand, the two introducing ports 32 are connected to the discharging ports 12, 22 of the fuel and water tanks 10, 20 by connecting pipes 36, respectively. Heating wires 36a and thermal insulating material 36b are disposed around outer surfaces of the connecting pipes 36.

In addition, the agitating device 30 has an agitator 37. The agitator 37 comprises agitating wings 37a disposed in the agitating chamber 31 for agitating the liquid fuel and the water, and an agitating motor 37b for rotating the agitating wings 37a. Thermal insulating material 39 for insulating between the agitating chamber 31 and the outside is disposed around the outer surface of the agitating device in the same way as the fuel and water tanks 10, 20.

Meanwhile, the ultrasonically operated modifying device 40 applies an ultrasonic wave to the liquid fuel and the water agitated to a certain extent and modifies the liquid fuel having high viscosity and poor quality into good emulsified oil. That is, generally, in order to modify liquid fuel having high viscosity and poor quality into good emulsified oil, water is added to the liquid fuel having high viscosity and poor quality, and then surfactant such as soap is added. Thus, by reducing interfacial tension between the water and the liquid fuel, the water as a dispersed phase is scattered in the liquid fuel as a dispersion medium in a fine particle phase (water-in-oil). This is the so-called emulsification process. However, instead of the surfactant such as soap, the present invention applies an ultrasonic wave to the liquid fuel and the water by using an ultrasonic vibrator and an ultrasonic wave-generating device, which was developed by the present inventor and issued as Korean Patent No. 110,354, so that the water as a dispersed phase is scattered in the liquid fuel as a dispersion medium in an ultra fine particle phase (water-in-oil).

Figure 5:
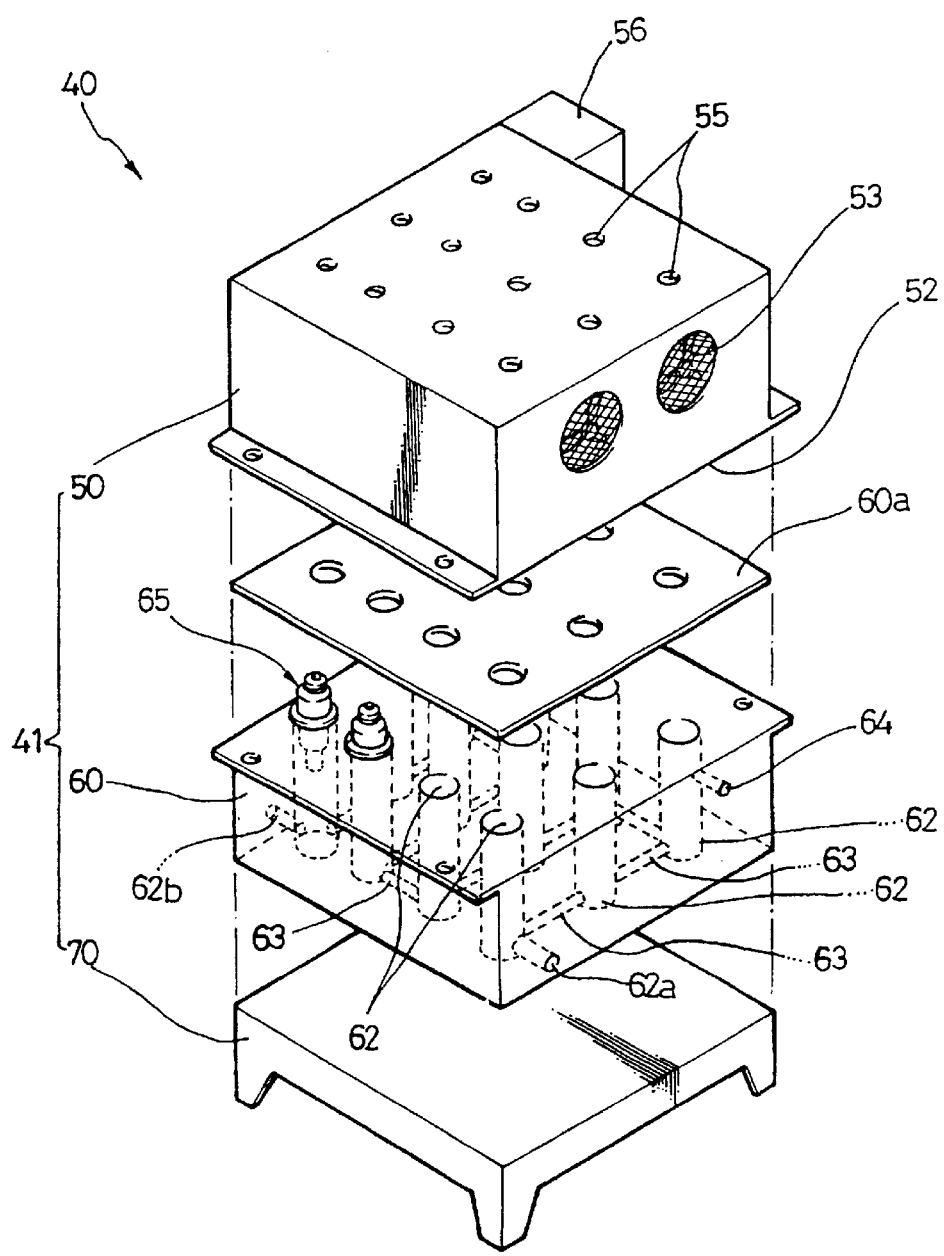
FIG. 5 is an exploded perspective view showing the constitution of an ultrasonically operated modifying device as a component of the present invention.
Figure 6:
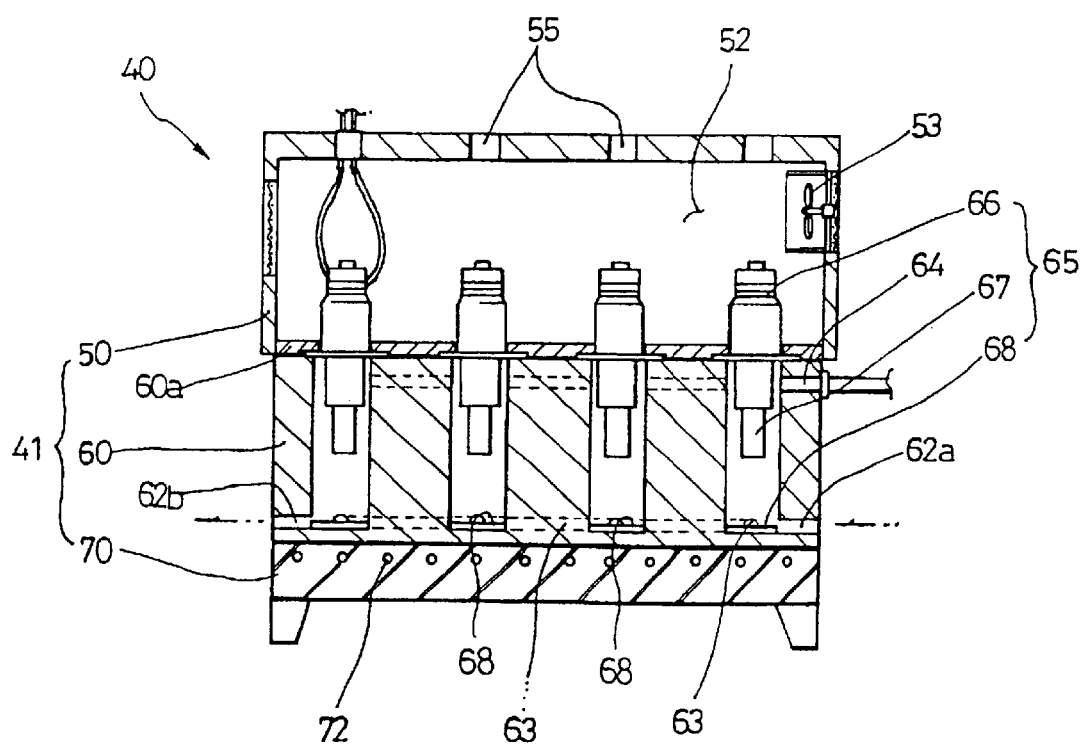
FIG. 6 is a sectional view showing the state that the ultrasonically operated modifying device of FIG. 5 is assembled.

As shown in FIGS. 5 and 6, the ultrasonically operated modifying device 40 employing this principle has a case 41 comprising an upper case 50, a lower case 60 and a heating plate 70. A cooling chamber 52 is formed in the upper case 50. A cooling fan 53 for introducing outside air and cooling the cooling chamber 52 is installed on one side of the cooling chamber 52. In addition, a plurality of throughholes 55 is formed in a top surface of the upper case 50. An ultrasonic vibration generator 56 is installed on a side surface of the upper case 50. Connectors for connecting ultrasonic wave-generating portions 65, which will be described later, to the ultrasonic vibration generator 56 are disposed on the throughholes 55.

A plurality of cylinders 62 are formed in the lower case 60. Each ultrasonic wave-generating portion 65 is disposed in each cylinder 62. The cylinders 62 are communicated by passages 63 so that the mixture of the fuel and the water introduced through an inlet 62a passes through respective cylinders 62 in sequence and is finally discharged through an outlet 62b. This makes more ultrasonic energy be transferred to the fuel passing through the cylinders 62. A return hole 64 for returning the evaporated gas generated during the fuel modifying process to the fuel tank 10 is formed on one side of one of the cylinders 62. This return hole 64 is connected to the return pipe 16 of the fuel tank 10 by a connecting pipe.

Meanwhile, as shown in FIG. 6, the ultrasonic wave-generating portion 65 disposed in the cylinder 62 of the lower case 60 comprises a vibrator 66 disposed on the top of the cylinder 62, a horn 67 disposed below the vibrator 66 and a reflecting plate 68 disposed on a bottom surface of the cylinder 62.

The vibrator 66 obtains Joule effect from the ultrasonic vibration generator 56, and vibrates at a specific frequency, that is, 28 kHz and 200 W. Simultaneously, it enhances the straightness of an ultrasonic wave to transfer its vibration energy to the liquid fuel. The reflecting plate 68 causes a cavitation phenomenon with a pressure wave generated when the liquid fuel and water vibrated by the vibrator 66 and horn 67 collide against the reflecting plate. Here, since the process and principle of making the liquid fuel and water into ultra fine particles by the vibrator 66, the horn 67 and the reflecting plate 68 are described in detail in Korean Patent No. 110,354, explanation thereof will be omitted.

With such structure, while the liquid fuel introduced passed through the inlet 62a into the interior of the cylinders 62 passes through the cylinders 62 in sequence, the water is dispersed into the liquid fuel in the fine particle phase by the ultrasonic wave so that the liquid fuel can be modified into emulsified oil (water-in-oil). Especially, water droplets contained in the emulsified oil become very fine particles while repeatedly passing through the cylinders 62 several times, and thus, the liquid fuel is modified into better emulsified oil. The good emulsified oil promotes microexplosion, which enhances its combustion efficiency. Meanwhile, soft components of the fuel are converted into gas by an ultrasonic energy. The gas is returned through the return hole 64 to the fuel tank 10 together with its volatile components. Here, A return pump (not shown) for suctioning gas in the interiors of the cylinders 62 and transferring it to the fuel tank 10 is installed on the ultrasonically operated modifying device 40.

As shown in FIGS. 5 and 6, the heating plate 70 is disposed beneath the lower case 60. Heating wires 72 is installed in the heating plate 70 and always heats the lower case 60 up to a constant temperature.

Referring to FIG. 1 again, a pump 80 puts predetermined pressure on the liquid fuel discharged from the ultrasonically operated modifying device 40. A nozzle 90 sprays the good emulsified oil, which has the predetermined pressure discharged from the pump 80, into the combustion chamber of the burner B.

The operation of the present invention having the above constitution will be explained with reference to FIGS. 1 to 6. First, the liquid fuel and the water appropriately heated in the fuel and water tanks 10, 20 are introduced into the agitating device 30. Then, the agitating device 30 appropriately agitates the liquid fuel and the water. Next, the liquid fuel and water agitated in the agitating device 30 are introduced into the ultrasonically operated modifying device 40. The liquid fuel and the water introduced into the ultrasonically operated modifying device 40 pass through the cylinders 62 of the case 41 in sequence, and are modified into good emulsified oil. The liquid fuel modified into good emulsified oil is pressurized by the pump 80 and discharged through the nozzle 90 to the outside.

Alternatively, although the liquid fuel is mixed with the water and modified into good emulsified oil in the present invention, the liquid fuel having high viscosity and poor quality may be directly introduced into the ultrasonically operated modifying device and modified into soft liquid fuel without mixing the liquid fuel with the water.

Thus, according to the ultrasonically operated liquid fuel modifying system of the present invention for modifying liquid fuel having high viscosity and poor quality into good emulsified oil having low viscosity by using the ultrasonic wave, there are advantages in that its combustion efficiency is enhanced, and the amount of harmful gas, especially CO and HC having a fatal impact on the human body, generated upon combustion of liquid fuel can be minimized.

Further, according to the present invention, vegetable oil having high viscosity and burning point can be modified into emulsified oil having low viscosity and burning point, which can be used as an alternative energy source that substitutes for petroleum.

The above embodiments are to be considered as illustrative. The present invention is not limited to the details given herein and may be appropriately changed within the scope of the spirit of the invention. For example, the shape and structure of each component illustrated in the embodiments of the present invention will be embodied in other modified forms.

Industrial Applicability

As described above, the ultrasonically operated liquid fuel modifying system of the present invention modifies liquid fuel having high viscosity and poor quality into good emulsified oil having low viscosity by using an ultrasonic wave, enhancing its combustion efficiency.

Further, there is an advantage in that the amount of CO and HC generated upon combustion of liquid fuel can be minimized.

Further, since vegetable oil having high viscosity and burning point can be modified into emulsified oil having low viscosity and burning point, it can be used as an alternative energy source that substitutes for petroleum.

What is claimed is:

1. An ultrasonically operated liquid fuel modifying system, comprising:

a fuel tank(10) for storing liquid fuel;

a water tank(20) for storing water;

an agitating device(30) in fluid communication with said fuel tank(10) and said water tank(20) for receiving and agitating the liquid fuel and the water into fuel and water mixture; and an ultrasonic modifier device(40) including an ultrasonic wave generator(56) and ultrasonic vibrator portions (65) associated with the ultrasonic wave generator(56) for generating and applying ultrasonic vibration to said fuel and water mixture fed from said agitating device (30) to produce emulsified oil of reduced viscosity, wherein said ultrasonic modifier device(40) further comprises a plurality of cylinders(62) each accommodating at least a part of said ultrasonic vibrator portions (65) at their top end, said cylinders serially interconnected with each other by fluid passageways(63) at their bottom ends.

2. The ultrasonically operated liquid fuel modifying system as recited in claim 1, wherein each of said ultrasonic vibrator portions(65) comprises a vibrator(66) for producing ultrasonic vibration energy at a predetermined frequency, a horn(67) for directing the vibration energy to the fuel and water mixture, and a reflector plate(68) for reflecting the vibration energy.

3. The ultrasonically operated liquid fuel modifying system as recited in claim 1, wherein a return hole(64) is provided at the top end of the respective one of said cylinders(62) for discharging gas generated in the respective cylinder(62), said return hole (64) connected to said fuel tank(10).

4. The ultrasonically operated liquid fuel modifying system as recited in claim 1, wherein each of said fuel tank(10), said water tank(20) and said ultrasonic modifier device(40) is provided with means for heating said liquid fuel and said water.

\* \* \* \* \*